United States Patent
Yang (10) Patent No.: US 12,488,128 B2
(45) Date of Patent: Dec. 2, 2025

(54) STATISTICS VISIBILITY CONTROL IN ENCLAVE DATABASE

(71) Applicants: Lemon Inc., Grand Cayman (KY); Beijing Volcano Engine Technology Co., Ltd., Beijing (CN)

(72) Inventor: Xinying Yang, Beijing (CN)

(*) Notice: Subject to any disclaimer, the term of this patent is extended or adjusted under 35 U.S.C. 154(b) by 121 days.

(21) Appl. No.: 18/541,458

(22) Filed: Dec. 15, 2023

(65) Prior Publication Data

US 2025/0200203 A1   Jun. 19, 2025

(51) Int. Cl.
  *G06F 16/24* (2019.01)
  *G06F 16/2453* (2019.01)
  *G06F 16/2458* (2019.01)
  *G06F 21/62* (2013.01)

(52) U.S. Cl.
  CPC ...... *G06F 21/6218* (2013.01); *G06F 16/2453* (2019.01); *G06F 16/2462* (2019.01); *G06F 2221/2113* (2013.01); *G06F 2221/2141* (2013.01)

(58) Field of Classification Search
  None
  See application file for complete search history.

(56) References Cited

U.S. PATENT DOCUMENTS

| | | | |
|---|---|---|---|
| 11,902,306 B1* | 2/2024 | Satish | H04L 63/1425 |
| 2005/0249391 A1* | 11/2005 | Kimmel | G06T 7/143 |
| | | | 382/128 |
| 2016/0110417 A1* | 4/2016 | Lakshminarayan | G06F 16/196 |
| | | | 707/718 |
| 2017/0006135 A1* | 1/2017 | Siebel | G06F 8/24 |
| 2020/0327252 A1* | 10/2020 | McFall | G06F 21/78 |
| 2021/0097431 A1* | 4/2021 | Olgiati | G06N 5/046 |
| 2021/0097432 A1* | 4/2021 | Olgiati | G06F 17/18 |
| 2023/0418867 A1* | 12/2023 | Prasad | G06F 16/81 |
| 2023/0419706 A1* | 12/2023 | Prasad | G06V 30/414 |
| 2025/0103572 A1* | 3/2025 | Loring | G06F 16/2219 |

* cited by examiner

*Primary Examiner* — Eliyah S. Harper
(74) *Attorney, Agent, or Firm* — Fish & Richardson P.C.

(57) ABSTRACT

A database management system provided in a trusted execution environment controls the visibility of a requested statistic for a database table column based on the source of the request. The visibility control is based on a visibility level of the database table column to the source of the request. The visibility of the provided statistic can further be based on a security level of the database table column even if the source of the request is not a permitted viewer. The statistic can include frequency or histogram data for the database table column.

14 Claims, 7 Drawing Sheets

| Security Level | Frequency Visiblity | Histogram Visibility |
| --- | --- | --- |
| Low | Values and Frequencies Plaintext | X-Axis Values and Numeric Y-Axis Data Plaintext |
| Medium | Frequencies Plaintext<br><br>Values Masked | Y-Axis Data Plaintext<br><br>X-Axis Values Masked |
| High | Values and Frequencies Masked | X-Axis Values and Numeric Y-Axis Data Masked |

STATISTICS VISIBILITY CONTROL IN ENCLAVE DATABASE

FIELD

The embodiments described herein pertain generally to database systems and methods for the creation and accessing of entries therein, particularly when visibility of statistics is controlled.

BACKGROUND

Conventional hardware-enabled encrypted database (H-EDB) systems support more operations (e.g., database operations using Structured Query Language (SQL), etc.) compared to software-oriented encrypted database (S-EDB) systems, but still far less than general database systems (e.g., SQL database systems, etc.). Conventional H-EDB systems typically have a partially hardware encrypted (P-HE) architecture that shares a client-side private key using Remote Attestation (RA) mechanism and registers authenticated DBMS operator code within the enclave. Once cipher-text from an end (e.g., a user end, etc.) is delivered (e.g., through the DBMS, etc.) to the enclave, the enclave first decrypts the cipher-text to plaintext, performs computations or operations on the plaintext, and then encrypts the computed plaintext (if needed) before replying to the DBMS.

Typically, P-HE databases are designed based on the constraint of the enclave, e.g., the constraint of the trusted execution environment (TEE) memory limitation or restrictions. Therefore, it may be impractical to authenticate the entire DBMS into an enclave to achieve a fully hardware encrypted (F-HE) database system for runtime execution because the input/output (I/O) cost in the P-HE database between the enclave and the DBMS may affect the system performance significantly.

SUMMARY

This disclosure is directed to database systems and methods for the creation and accessing of entries therein, particularly when visibility of statistics is controlled.

Recent emergence of increased TEE memory may enable an F-HE architecture. Features in the embodiments disclosed herein may provide an otherwise implement an "in-enclave" (i.e., F-HE) database system (e.g., a relational database system, etc.) to support the data privacy-preserving and verifiable functionalities by residing the entire DBMS (or the entire database system) into the TEE (e.g., the TEE memory, etc.), which may reform the current P-HE model.

It is to be understood that in the F-HE database architecture, the mechanism may provide security and/or protect privacy by preventing data leaks for all memory, processor (s) such as central processing units (CPUs), and I/O. As such, the DBMS-internally-used data structures and data stores that do not have explicit retrieval interfaces (e.g., system and physical logs), may be prevented from being viewed by adversaries. For example, a redo log of a database system, which is a physical log, stores all changes made to a database in log files. Thus, operations involving the redo log may include being loaded into the memory and participating in the processor (such as the CPU, etc.) computation, being written and read by disk I/O as a log file, and being transmitted between replicas through the network I/O. None of the operations pertaining to the redo log may leak data in the F-HE paradigm because the enclave memory and the CPU are protected to ensure security and privacy, further, data may be encrypted by the enclave or TEE before written on the disk, and the network transmission may be secured e.g., by Remote Attestation-Transport Layer Security (RA-TLS) protocol.

It is also to be understood that in the F-HE database architecture, for data structures and data stores (e.g., logical log, etc.) that have some explicit retrieval interfaces, additional security and/or privacy protections need to be in place. Features in the embodiments disclosed herein may provide a logical log encoding and mask-enabled visibility control to achieve efficient privacy-preserving database logical log in the F-HE, which may reform the client-side cryptography (e.g., using the RA mechanism, etc.) in the conventional P-HE databases. That is, features in the embodiments disclosed herein may achieve the secure and/or privacy protection without the need of the client-side cryptography and the corresponding processes related to the client-side cryptography.

Database managers can use database statistics to optimize the access paths within a database, thereby improving the efficiency of queries and limiting input/output (I/O) load. The statistics can include, for example, frequency data for values of entries within the database, histogram data characterizing the entries in the database, cardinality data, or other such data. In some databases, the statistics such as frequency data, histogram data, and the like can be regarded as sensitive and thus requiring security. Present embodiments allow for user-defined security for database statistics, and masking based on the user-defined security. Additionally, this security can be performed in a database residing entirely within a trusted execution environment (TEE), complementing the protection provided by the TEE for data structures and data stores that do not have explicit retrieval interfaces. By using a TEE to control access to database statistics, the database can be secured without high input/output load typically associated with partial hardware encryption schemes.

In an embodiment, a method of operating a database includes receiving, at a parser of a database management system (DBMS), a request for a database statistic regarding a database table column from a source, wherein the DBMS is in a trusted execution environment. The method further includes determining a visibility level of the database statistic regarding the database table column to the source, based on comparison of the source to permitted viewers of the database statistic. The method also includes providing the requested database statistic to the source, wherein the database statistic provided to the source is based on the visibility level of the database statistic to the source.

In an embodiment, the database statistic is frequency data for entries of the database table column. In an embodiment, the database table column has a security level, and the frequency data provided to the source is further based on the security level. In an embodiment, the source is not a permitted viewer, the frequency data provided to the source based on the security level includes a numeric frequency data having plaintext values and column data having plaintext values when the security level is a low security level. In an embodiment, when the source is not a permitted viewer, the frequency data provided to the source based on the security level includes a numeric frequency data having plaintext values and column data having masked values when the security level is a medium security level. In an embodiment, when the source is not a permitted viewer, the frequency data provided to the source based on the security level includes numeric frequency data having masked values and column data having masked values when the security level is a high security level.

In an embodiment, the database statistic is histogram data for entries of the database table column. In an embodiment, the database table column has a security level, and the characteristics of the histogram data provided to the source are further based on the security level. In an embodiment, when the source is not a permitted viewer, the histogram data provided to the source based on the security level includes numeric y-axis data having plaintext values and x-axis value data having plaintext values when the security level is a low security level. In an embodiment, when the source is not a permitted viewer, the histogram data provided to the source based on the security level includes numeric y-axis data having plaintext values and x-axis value data having masked values when the security level is a medium security level. In an embodiment, when the source is not a permitted viewer, the histogram data provided to the source based on the security level includes numeric y-axis data having masked values and x-axis value data having masked values when the security level is a high security level.

In an embodiment, the method further includes generating, within the DBMS, the database table column the database table column including a column identifier for the database table column, permitted viewers for the database table column, and a security level of the database table column.

In an embodiment, a database management system (DBMS) is located within a trusted execution environment. The DBMS includes a database table column. The DBMS further includes a parser configured to receive a request for a database statistic regarding a database table column from a source and determining a visibility level of the database statistic regarding the database table column to the source, based on comparison of the source to permitted viewers of the database statistic. The DBMS further includes a runtime environment configured to provide the requested database statistic to the source, wherein the database statistic provided to the source is based on the visibility level of the database statistic to the source. In an embodiment, the database table column includes a column identifier for the database table column, permitted viewers for the database table column, and a security level of the database table column and the database statistic provided to the source are further based on the security level. In an embodiment, the database statistic is frequency data for the database table column. In an embodiment, the database statistic is frequency data for the database table column.

In an embodiment, a non-transitory computer-readable medium has computer-executable instructions stored thereon that, upon execution, cause one or more processors to perform operations. The operations include providing a database management system (DBMS) in a trusted execution environment, receiving, at a parser of the DBMS, a request for a database statistic regarding a database table column from a source, determining a visibility level of the database statistic regarding the database table column to the source, based on comparison of the source to permitted viewers of the database statistic, and providing the requested database statistic to the source. The database statistic provided to the source is based on the visibility level of the database statistic to the source. In an embodiment, the database table column further includes a security level, and the database statistic provided to the source is further based on the security level. In an embodiment, the database statistic is frequency data for the database table column. In an embodiment, the database statistic is histogram data for the database table column.

DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

This disclosure is directed to database systems and methods for the creation and accessing of entries therein, particularly where visibility of statistics are controlled.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "database" is a term of art that may refer to an organized collection of data or a type of data store based on the use of a database management system (DBMS), the software that interacts with end users, applications, and/or the database itself to capture and analyze the data. As referenced herein, a "database server" is a term of art that may refer to a server which uses a database application that provides database services to other computer programs or to computers, as defined by the client-server model. It is to be understood that some DBMS typically provides database-server functionality, and that some DBMS may rely exclusively on the client-server model for database access. It is also to be understood that the DBMS may additionally encompasses the core facilities provided to administer the database, and that the sum total of the database, the DBMS, and the associated applications may be referred to as a database system. In an example embodiment, the database system may be a relational database system that may optionally use Structured Query Language (SQL) for querying and updating the database. It is further to be understood that a database may include one or more database tables, with every column of a database table representing a particular variable or field, and each row of the database table corresponding to a given record or entry. The table may list values for each of the variables or fields, and/or for each record or entry.

As referenced herein, a "DBMS engine" or a "database engine" is a term of art that may refer to the software or algorithm(s) in a database system that recognizes and interprets database commands (e.g., SQL commands, etc.) to access a database and interrogate data in the database. In an example embodiment, a DBMS engine may include an SQL engine (or an SQL query engine).

As referenced herein, an "enclave" is a term of art and may refer to a trusted execution environment (TEE) that may protect sensitive data and code, e.g., from attackers that control, attempt to control, or have otherwise compromised the operating system and the hypervisor on a host machine.

It is to be understood that an enclave or TEE may refer to a set of system resources (e.g., memory, input/output, processors such as central processing units, etc.) that operate in ta common security domain and that share the protection of a single, common, continuous security perimeter. In an example embodiment, an enclave or TEE may refer to a private regions of memory designed to be protected from processes running at higher privilege levels. It is also to be understood that an enclave or TEE may refer to a secure area to help code and data loaded inside it to be protected with respect to confidentiality and integrity. Data integrity prevents unauthorized entities from outside the enclave or TEE from altering data, while code integrity prevents code in the enclave or TEE from being replaced or modified by unauthorized entities, which may include the computer owner or operator itself. This may be done by implementing confidential architectural security which offers hardware-based memory encryption that isolates specific application code and data in memory. An enclave or TEE may be an isolated execution environment that provides security features such as isolated execution, integrity of applications executing with the enclave or TEE, along with confidentiality of their assets. That is, the enclave or TEE may offer an execution space that provides a higher level of security for trusted applications running on the device than an operating system.

As referenced herein, a "fine-grained" or "granular" data privacy preservation is a term of art that may refer to a method, program, or system of preserving data privacy with respect to a certain portion of data or a certain aspect of data. In an example embodiment, a fine-grained data privacy preservation database may provide a fine-grained data privacy preservation mechanism e.g., to protect data privacy of one or more columns/fields (and/or one or more rows/records) of a database table. In contrast, a "coarse-grained" data privacy preservation is a term of art that may refer to a method, program, or system of preserving data privacy for generalized data privacy control. In an example embodiment, a coarse-grained data privacy preservation database may provide a coarse-grained data privacy preservation mechanism e.g., to protect data privacy of an entire database table (e.g., based on a user's role or permission, etc.) instead of a certain portion of the database table or a certain aspect of the database table.

As referenced herein, a "logical log" in a database is a term of art that may refer to a log file (e.g., a circular file, etc.) containing log records generated by e.g., the database server (e.g., the DBMS, etc.) to keep a history of transactions and database server changes since the time of the last storage-space backup. The log records in the logical log represent logical operations of the database server, as opposed to physical operations. As referenced herein, a "physical log" in a database is a term of art and may refer to a log file containing the contents of each row/record that is changed. Typically, logical logging means logging not the changed rows/records but the commands (e.g., SQL statements, etc.) that lead to the row/record changes (e.g., the insert, update, and/or delete statements, etc.). Logical logs may describe changes in the form of a record mirror or command (e.g., a SQL statement, etc.). Physical logging means logging the contents of each row/record that is changed. Physical logs may describe the changes in a way that is more partial to the underlying data block operation. In an example embodiment, a logical log may include an audit-log, while a physical log may include a redo log.

As referenced herein, a "system catalog" table in a database is a term of art that may refer to table(s) and/or view(s) that describe the structure of the database. It is be understood that the system catalog table may refer to the data dictionary, which may contain everything that the database knows about itself.

As referenced herein, "structured data" in a database is a term of art that may refer to preformatted data, the format of which is pre-defined in rows/records and columns/fields and typically stored as a table. It is to be understood that structured data may be categorized as quantitative data, and may be highly organized and easily understood by machine language. Structured data may be inputted, searched, and/or manipulated easily using the DBMS. In an example embodiment, a database table (e.g., a system catalog table, etc.) is structured data. As referenced herein, "unstructured data" in a database is a term of art that may refer to complex, qualitative, and/or unorganized data that may not conform to any one particular standard (e.g., unstructured data may be numerical, alphabetical, Boolean, etc. or a mix of some or all of them), and may not be stored in a database since the data strings may have mixed datatypes which cannot fit into either a row/record or a column/field of a table. In an example embodiment, a log file (e.g., physical log, logical log, etc.) is unstructured data.

Figure 1:
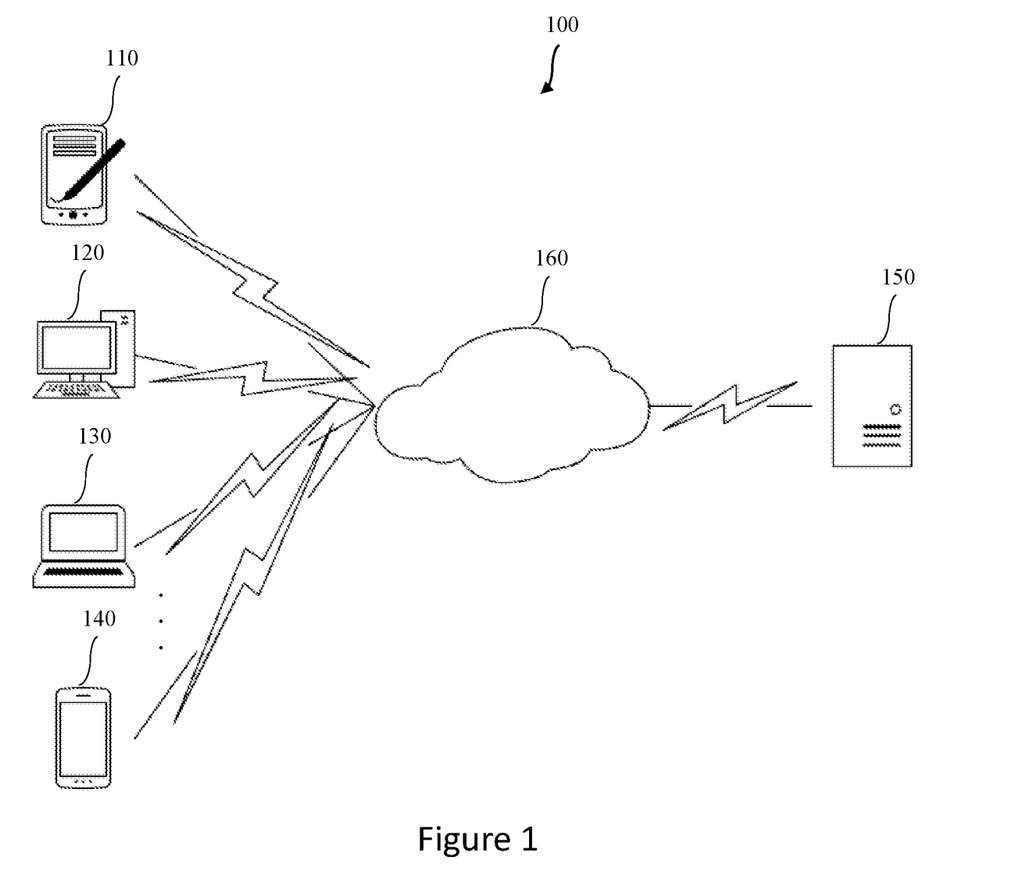
FIG. 1 shows a schematic view of an example data privacy preservation database system according to an embodiment.

FIG. 1 shows a schematic view of an example data privacy preservation database system according to an embodiment. The system 100 may include terminal devices 110, 120, 130, and 140, a network 160, and/or a server 150. It is to be understood that the server 150 may be a database server that provides database services to other computer programs or to computers, as defined by a client-server model. The terminal devices 110, 120, 130, and 140 may be the device(s) used to query (or operate, e.g., analyze, process, use, store, share, access, etc.) the database on or from the server. It is also to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as database applications, social media applications, online shopping applications, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may optionally include the network 160 while including the terminal device 110, 120, 130, and 140, or the server 150.

It is further to be understood that the terminal device 110, 120, 130, and 140 and the server 150 may each include one or more processors, a memory, and a storage device storing one or more programs. Each of the terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
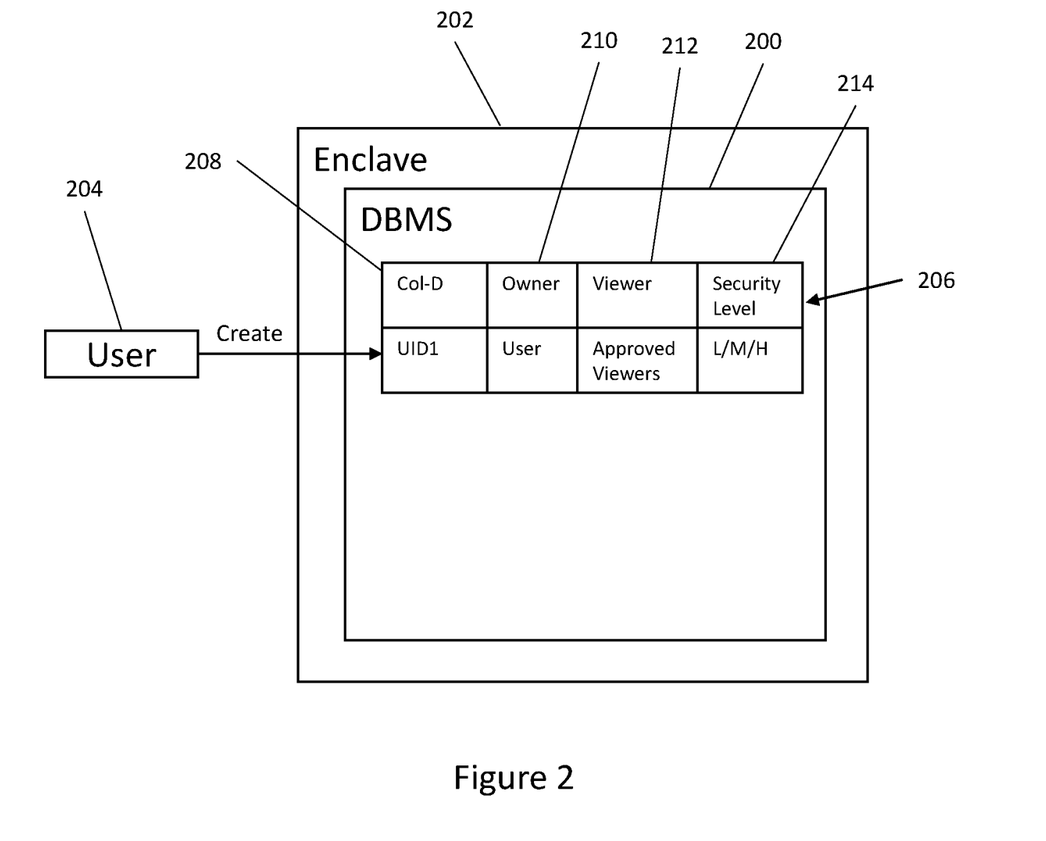
FIG. 2 shows a schematic of a database system arranged in accordance with at least some embodiments described herein.

FIG. 2 shows a schematic of a database system according to an embodiment. As shown in FIG. 2, database management system (DBMS) 200 is provided inside enclave 202, for example being stored and executed entirely using resources of the enclave 202. A user 204 creates a database table including a maskable column, which is defined in secret column catalog 206. Secret column catalog 206 includes a column identifier 208 for the maskable column, an owner 210 for the database table, allowed viewers 212 for the maskable column, and a security level 214 for the maskable column.

DBMS 200 is a database management system configured to handle generation, creation, operation, access, manipulation, searching, and/or retrieval of entries in a database, such as database tables, columns thereof, and the like. DBMS 200 can be provided within enclave 202, for example by being stored and executed entirely using resources of the enclave 202. Enclave 202 may be a trusted execution environment (TEE), which may be a set of encrypted system resources (e.g., memory, input/output, processors such as central processing units, etc.). DBMS 200 can include a database engine, such as an SQL engine.

User 204 is a user of the database including DBMS 200. User 204 can be any suitable user of the database having privileges to create entries in the database. User 204 generates one or more database entries including at least one maskable column. The maskable column is a column designated by user 204 as being visibility controlled. The maskable column can be visibility controlled for any suitable reason, such as the sensitivity or confidentiality of the data contained therein, policies, regulations, rules, or laws regarding the handling of the data contained therein, and the like. The maskable column may have its visibility controlled with respect to requests for statistical data of the column, for example requests by administrators or other users of the database, such as when an administrator performs optimization of access paths in the database. The characteristics of the maskable column and data governing the masking of the maskable column can be stored in secret column catalog 206. Secret column catalog 206 can include any suitable data required to control the masking of the maskable column, such as a column identifier 208, an indication of the owner 210, definition of one or more allowed viewers 212, and optionally a security level of the maskable column 214.

Column identifier 208 is an identifier for the maskable column. Column identifier can be any suitable data identifying the maskable column, such as a flag provided on the column, a link or pointer, an identification number, a memory position, or the like. Column identifier 208 can be referenced, for example, to determine whether a request for statistical data is a request for statistical data from a maskable column. Column identifier 208 can be associated with the maskable column when the maskable column is created, when the column is edited and set by the user 204 to be a maskable column, or the like.

Owner 210 is an identifier for the creator of the maskable column. Owner 210 can be an identifier associating the user 204 with the maskable column. In embodiments, owner 210 can be referenced to, for example, determine whether to permit or deny editing of the maskable column, modification of the marking of the column as the maskable column, or the like. In an embodiment, owner 210 can be referenced when determining the visibility of the statistical data or components thereof, to permit the user 204 to view the statistical data of the maskable column without any masking of the data contained therein.

Allowed viewers 212 define sources of requests for database statistics that are permitted to view the database statistics without masking of some or all of said statistical data for the maskable column. Allowed viewers 212 can be any suitable definition of request sources that are permitted to receive unmasked statistical data when requesting statistical data for the maskable column identified by the column identifier 208. Allowed viewers 212 can include, for example, a list of users of the database system, one or more classes of users of the database system, a list of permitted request sources such as particular functions, programs, interfaces, or the like, one or more classes defining permitted request sources, or the like. The allowed viewers 212 can be referenced to compare a source of a request for statistical data regarding the maskable column, to determine if the request source is permitted to receive the statistical data in an unmasked format, for example as discussed below and shown in FIGS. 3 and 4.

Security level 214 can optionally be provided to control the visibility of the database statistics to request source other than the defined allowed viewers 212. The security level 214 can be a definition of the visibility of the maskable column to request sources other than request sources identified by the allowed viewers 212. Security level 214 can be, for example, a selected one of multiple predefined levels defined in the DBMS 200 or interfaces thereof, such as a high, medium, or low level of security. In an embodiment, security level 214 is a definition of the visibility particular to the maskable column, for example according to one or more rules provided by the user 204. The security level can define what characteristics of the statistical data, such as numeric frequency values, column data, x-axis and y-axis values of a histogram, and the like are masked or unmasked when provided in response to a request from a request source that is not defined as an allowed viewer in 212. In an embodiment, security level 214 can be omitted, and request sources other than those according to the allowed viewers 212 can be provided only fully masked statistical data when requesting statistical data regarding the maskable column. A non-limiting example of a set of low, medium, and high security levels 214 showing the respective visibilities of particular characteristics of frequency data and histogram data is described below and shown in FIG. 5.

Figure 3:
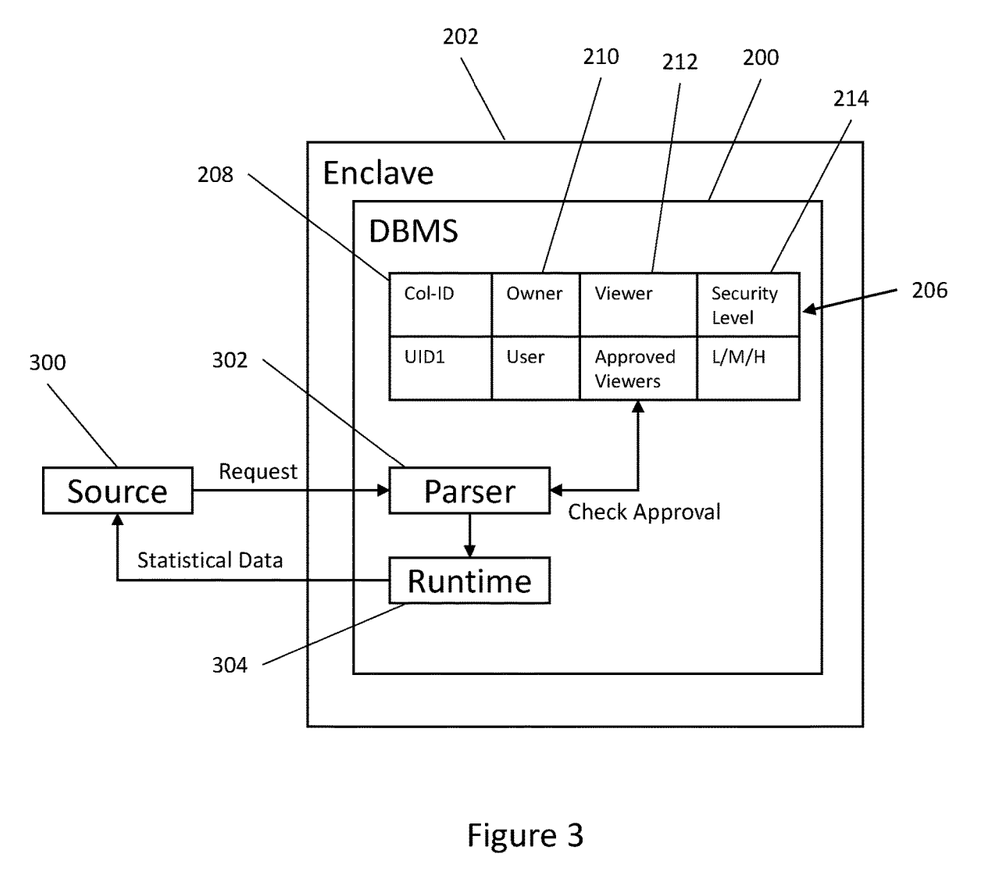
FIG. 3 shows a schematic of a database system arranged in accordance with at least some embodiments described herein.

FIG. 3 shows a schematic of a database system according to an embodiment. FIG. 3 shows a request source 300 requesting statistical data for the database table including the maskable column as defined in secret column catalog 206 within the DBMS 200 provided in enclave 202. The request source 300 provides the request for statistical data to a parser 302 of the DBMS 200. The parser 302 determines whether the request source 300 against the allowed viewers 212 for that column identifier 208 as defined in secret column catalog 206. When the request source 300 is determined to be included in the allowed viewers 212, the parser 302 can instruct a runtime environment 304 to provide the statistical data to the request source 300 without any masking of the statistical data.

Request source 300 can be any suitable source of a request for statistical data from the database. In the embodiment shown in FIG. 3, the request source 300 is a request source that is included in the allowed viewers 212. The request source 300 can be, for example, a user of the DBMS 200 other than the user 204, an automated call for the statistical data, a call for the statistical data made through an API, or any other suitable source of a request for statistical data. The statistical data can be any suitable statistical data regarding the contents of the database, such as frequency data, histogram data, cardinality data, or the like regarding one or more columns of a database table. In an embodiment, the statistical data includes frequency data for a database table column. In an embodiment, the statistical data includes histogram data for a database table column. The statistical data can be requested by request source 300 for any suitable reason, for example to adjust pathing in the database, improve efficiency in retrieving entries from the database, for display of the statistical data itself, and the like.

The request from request source 300 is received at a parser 302 that is provided within the DBMS 200. The parser 302 is a module of the DBMS 200 configured to receive the request and process the request and encrypted column catalog 206 to determine the visibility level of the statistical data subject to the request. The parser 302 can reference the column identifier 208 to determine if the request is directed to a maskable column. When the request is directed to statistical data for a particular maskable column, the parser 302 can reference the owner 210 and allowed viewers 212 for the maskable column to compare the request source 300 to the set of request sources able to obtain unmasked statistical data for the maskable column according to owner 210 and allowed viewers 212. In the embodiment shown in FIG. 3, parser 302 compares the request source 300 to the allowed viewer 212 defined in the encrypted column catalog and finds that request source 300 is included therein, and thus permitted to receive unmasked statistical data from the maskable column identified by column identifier 208. When the request source 300 is permitted to receive the unmasked statistical data, parser 302 can direct the runtime environment 304 to provide the statistical data responsive to the request from request source 300 in an unmasked format, for example as plaintext data.

Runtime environment 304 is a module of the DBMS 200 configured to respond to the request from request source 300 according to the visibility level determined by parser 302. Runtime environment 304 can be any suitable module for interfacing with request source 300 to respond to the request, such as an application, an application programming interface (API) or any other suitable module. Runtime environment 304 can be provided within the DBMS 200 that is within the enclave 202. Runtime environment 304 can present the statistical data responsive to the request in a format without masking of the statistical data or any components thereof when the visibility level of the statistical data is full visibility to the request source 300, for example when the request source 300 is included in allowed viewers 212.

Figure 4:
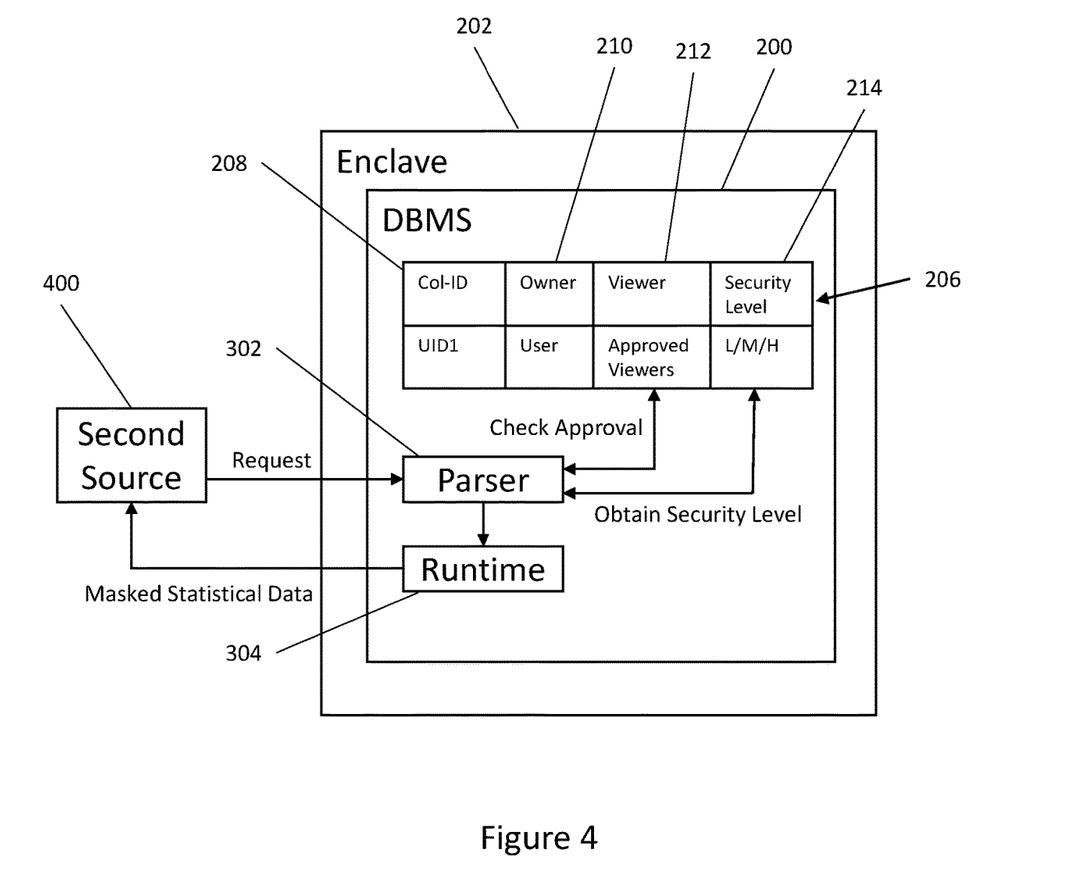
FIG. 4 shows a schematic of a database system arranged in accordance with at least some embodiments described herein.

FIG. 4 shows a schematic of a database system according to an embodiment. FIG. 4 shows a second request source 400 requesting statistical data for the database table including a maskable column. In the embodiment shown in FIG. 4, second request source 400 is not included in the allowed viewers 212. The second request source 400 provides the request for statistical data to parser 302. The parser 302 reference the second request source 300 against the allowed viewers 212. When it is determined that second request source 400 is not included in the allowed viewers 212, the parser 302 can also reference the security level 214. The parser 302 can determine a visibility level for the statistical data of the maskable column based on the security level 214, and direct the runtime environment 304 to present the statistical data of the maskable column based on the determined visibility level.

Second request source 400 can be any suitable source of a request for statistical data from the database that is not identified in the allowed viewers 212. The second request source 400 for example, a user of the DBMS 200 other than the user 204 or request source 300, an automated call for the statistical data, a call for the statistical data made through an API, or any other suitable source of a request for statistical data. The statistical data can be any suitable statistical data regarding the contents of the database, such as frequency data, histogram data, cardinality data, or the like regarding one or more columns of a database table. In an embodiment, the statistical data is frequency data for a database table column. In an embodiment, the statistical data is histogram data for a database table column. The statistical data can be requested by second request source 400 for any suitable reason, for example to adjust pathing in the database, improve efficiency in retrieving entries from the database, for display of the statistical data itself, and the like.

In the embodiment shown in FIG. 4, parser 302 receives the request from second request source 400, and process the request and encrypted column catalog 206 to determine the visibility level of the statistical data subject to the request. The parser 302 references the column identifier 208 to determine if the request is directed to a maskable column. When the request is directed to statistical data for a particular maskable column, the parser 302 can check the owner 210 and allowed viewer 212 for the maskable column to compare the second request source 400 to the set of request sources able to obtain unmasked statistical data for the maskable column. In the embodiment shown in FIG. 4, the second request source is not an allowed viewer according to owner 210 and allowed viewers 212. In the embodiment shown in FIG. 4, the parser 302 further references the security level of the maskable column to determine the visibility level of the statistical data. In an alternative embodiment, when it is determined at parser 302 that the second request source is not an allowed viewer according to owner 210 and allowed viewers 212, the visibility level of the data can be according to a global policy, for example providing fully masked data to the runtime environment 304 without requiring reference to a security level for the particular maskable column.

The visibility level of the statistical data can be full visibility, such as presenting the statistical data as plaintext data, partially masked where some characteristics of the statistical data are masked, or full masked where all characteristics of the statistical data are masked. The masking can be any suitable masking of data, such as hiding or omitting those characteristics, replacing the characteristics with scrambled or encrypted data or meaningless generated data, or any other suitable means of preventing the masked characteristics from being seen. The visibility level can be full visibility for request sources that are identified as the owner 210 or approved viewers 212. When the request source is not identified as the owner 210 or approved viewers 212, the masking can be based on a general or default policy such as full masking of all data, or based on security level 214 particular to the maskable column. For example, the security level 214 can dictate a visibility level for the statistical data that is full visibility, fully masked, or partially masked when the request source is not identified as the owner 210 or approved viewers 212. The security level 214 can further define the characteristics of the statistical data that are masked where the statistical data is to be partially masked, as described below and shown in FIG. 5, particularly with respect to medium security level 504.

Runtime environment 304 presents the statistical data according to the visibility level provided by the parser 300. In the embodiment shown in FIG. 4, the runtime environment presents the statistical data according to the visibility level when second requester 400 is not the owner 210 or an authorized viewer 212, for example being unmasked such as plaintext data or partially or fully masked in accordance with global policy or the security level 214.

Figure 5:
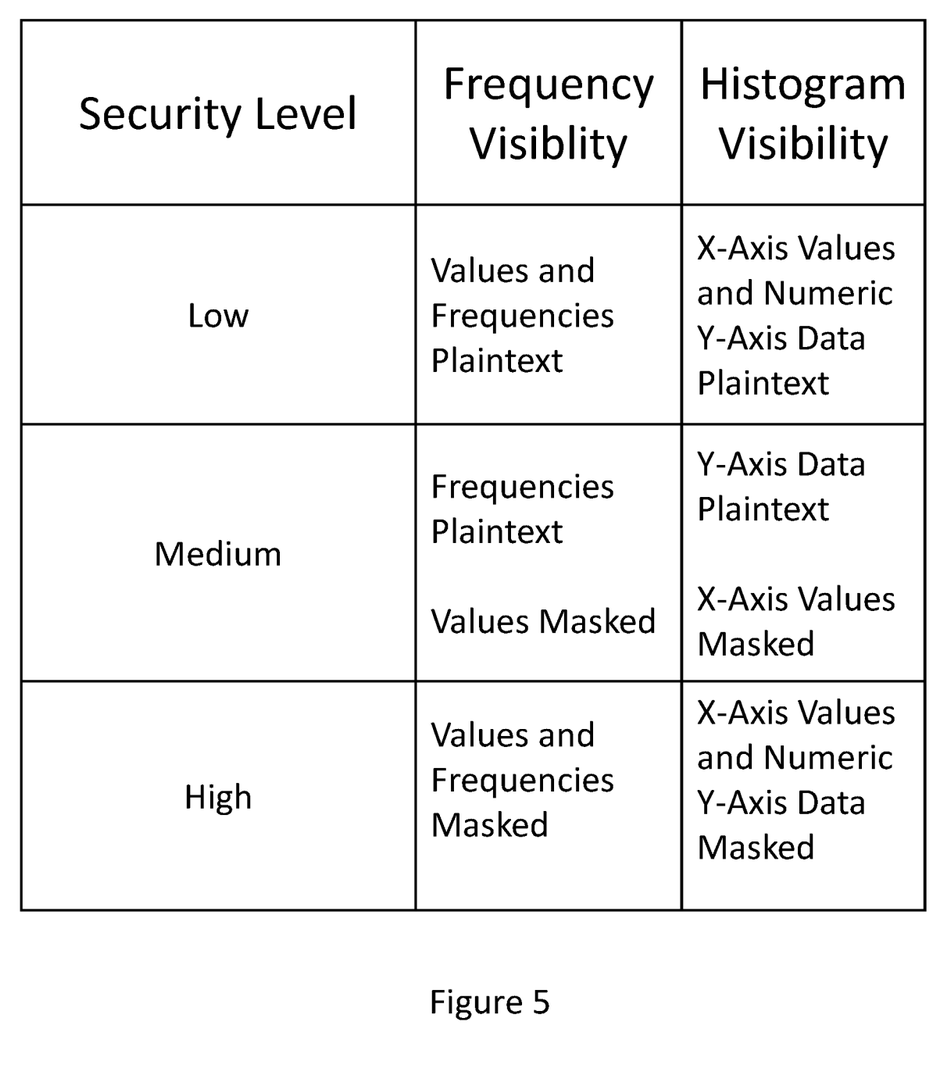
FIG. 5 shows security levels and displayed data arranged in accordance with at least some embodiments described herein.

FIG. 5 shows security levels and displayed data according to an embodiment. In the embodiment shown in FIG. 5, the security levels 500 include a low security level 502, a medium security level 504, and a high security level 506.

Security levels 500 are one or more sets of rules governing the visibility of statistical data for maskable database columns when requested by a request source that is not included among permitted viewers for the maskable database column. The security levels 500 and associated visibility for statistics shown in FIG. 5 are exemplary embodiments, and security levels 500 can include more or fewer levels defining visibility suitable for the sensitivity of the data, the possible request sources, and the like. The number of security levels 500 and visibility of statistical data based on each respective security level can be customized to provide desired granularity and data privacy suitable for the database in which the security levels 500 are implemented.

In the scheme for security levels 500 shown in FIG. 5, low security level 502 can be used for at least some maskable database columns. In particular, the low security level 502 can be used for columns containing data of extremely low sensitivity, confidentiality or privacy requirements, or the like. The low security level 502 can allow visibility of all aspects of the statistical data for the database column. For frequency data, the visibility of the statistical data at the low security level 502 can include providing the frequency data entirely in a visible form such as plaintext data. The frequency data provided in plaintext data can include the values themselves as well as the particular frequencies of those values. For histogram data, the visibility of the statistical data at the low security level 502 can include providing the histogram data entirely in a visible form such as plaintext data. The histogram data provided in plaintext data can include both x-axis values as well as numeric y-axis data of the histogram.

In the scheme for security levels 500 shown in FIG. 5, medium security level 504 can be used for at least some maskable database columns. In particular, the medium security level 504 can be used for columns containing data of moderate sensitivity, confidentiality or privacy requirements, such as some business records or the like. The medium security level 504 can allow visibility of some aspects of the statistical data for the database column while masking the particular values included in the database column that could be discerned from the statistical data. For frequency data, the visibility of the statistical data at the medium security level 504 can include providing the frequency data such that the values themselves are masked, while the particular frequencies of those values can be provided in a visible form such as being plaintext data. The masking of the values in the frequency data can include hiding or omitting those values, replacing the values with scrambled data or meaningless generated data, or any other suitable means of preventing the masked values from being seen. For histogram data, the visibility of the statistical data at the medium security level 504 can include providing the histogram data such that the x-axis values are masked, while the numeric y-axis data of the histogram can be provided in a visible form such as being plaintext data. The masking of the values in the frequency data can include hiding or omitting those values, replacing the values with scrambled or encrypted data or meaningless generated data, or any other suitable means of preventing the masked values from being seen.

In the scheme for security levels 500 shown in FIG. 5, high security level 506 can be used for at least some maskable database columns. In particular, the medium security level 506 can be used for columns containing data of high or extreme sensitivity, confidentiality or privacy requirements, such as personally identifying information, patent health data, salary data, highly confidential business records, or the like. The high security level 506 can mask the visibility of all aspects of the statistical data. For frequency data, the visibility of the statistical data at the high security level 506 can include providing the frequency data such that the values and the particular frequencies of those values are both masked. The masking of the values in the frequency data can include hiding or omitting those values, replacing the values with scrambled data or meaningless generated data, or any other suitable means of preventing the masked values from being seen. For histogram data, the visibility of the statistical data at the high security level 506 can include providing the histogram data such that the x-axis values and the numeric y-axis data of the histogram are both masked. The masking of the values in the frequency data can include hiding or omitting those values, replacing the values with scrambled data or meaningless generated data, or any other suitable means of preventing the masked values from being seen.

Figure 6:
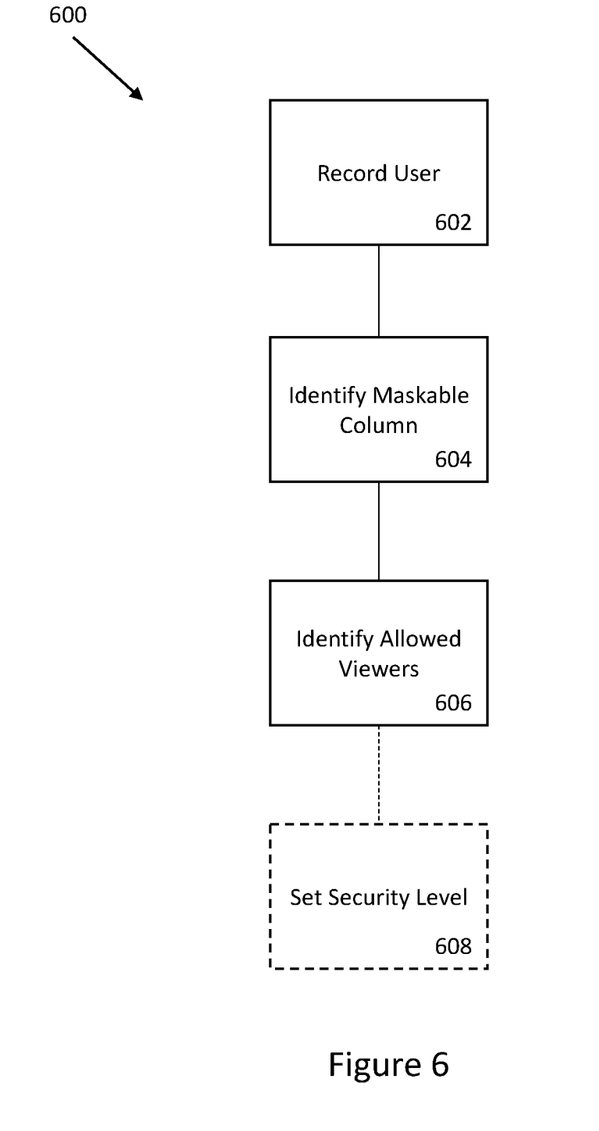
FIG. 6 shows a flowchart of a method for creating a database including a maskable column arranged in accordance with at least some embodiments described herein.

FIG. 6 shows a flowchart of a method 600 for creating a database entry including a maskable column according to an embodiment. Method 600 can be performed at a DBMS provided in an enclave, such as enclave 202 as discussed above and shown in FIGS. 2-4. A user of the DBMS can create the database entry. The user that is creating the database entry can be recorded at 602. This can be based on, for example, the login information or status of the user creating the database. The user recorded at 602 can be stored, for example as the owner field 210 of the encrypted column catalog 206 as shown in FIGS. 2-4 and described above. The user can identify a column of data as being a maskable column at 604, for example through a selection in an entry interface provided by the DBMS. The identification of the maskable column received at 604 can be stored. In an embodiment, the identification of the maskable column can be recorded, for example in the column identifier field 208 of encrypted column catalog 206 as described above and shown in FIGS. 2-4. One or more approved viewers can be defined at 606. The approved viewers can be any identification of an approved viewer or class of approved viewers for the contents of the maskable column. The approved viewers can be defined at 606 by the user, for example through a user interface of the DBMS. The approved viewers defined at 606 can be stored in the DBMS. In an embodiment, the approved viewers can be stored in the approved viewers field 212 of the encrypted column catalog 206. Optionally, the creation of the database entry having a maskable column according to the method 600 can further include setting a security level for the maskable column 608. The security level can be a definition of what data to return when a non-approved viewer requests statistical data for the maskable column. The security level can be set at 608 by, for example, the user defining one or more rules, or selecting a pre-set group of rules through a user interface of the DBMS. The security level can also be stored in the DBMS. In an embodiment, the security level set at 608 can be stored in an encrypted column catalog 206, for example in the security level field 214 as discussed above and shown in FIG. 214.

Figure 7:
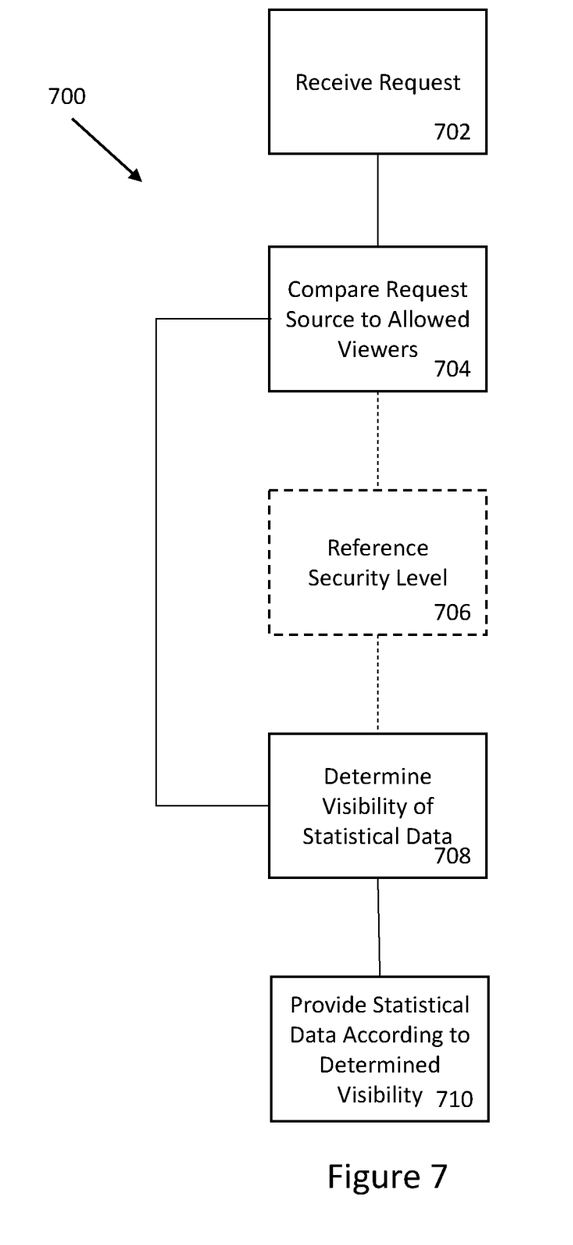
FIG. 7 shows a flowchart of a method for accessing statistical data of a database arranged in accordance with at least some embodiments described herein.

FIG. 7 shows a flowchart of a method 700 for accessing statistical data of a database according to an embodiment. Method 700 can be performed at a DBMS provided in an enclave, such as enclave 202 as discussed above and shown in FIGS. 2-4. Method 700 includes receiving a request for statistical data at 702. The request can come from any suitable source, for example the request source 300 or second request source 400 as described above and shown in FIGS. 3 and 4. The request received at 702 can be handled in the DBMS by any suitable software, such as, for example, a parser such as parser 302 described above and shown in FIGS. 3 and 4. The handling of the request can include comparing the source of the request received at 702 to allowed viewers of the maskable column subject to the request received at 702. When the source of the request is an allowed viewer according to the comparison made at 704, the method can proceed to determining the visibility level of the statistical data to be full visibility at 708. When the source of the request is not an allowed viewer according to the comparison made at 704, the method 700 can optionally proceed to referencing the security level at 706. The security level referenced at 706 can define the visibility level for the statistical data, for example according to the security levels shown in FIG. 5 and described above. In an embodiment where the security level is referenced at 706, the visibility level can be determined at 708 according to the security level when the source of the request received at 702 is not an allowed viewer according to the comparison at 704. In an embodiment, when referencing the security level at 706 is omitted from the method 700, the visibility level can be determined at 708 by a default rule for when the source of the request received at 702 is not an allowed viewer according to the comparison at 704, for example fully masking data provided in response to such requests. The statistical data is provided in response to the request according to the determined visibility at 710. Where the statistical data is determined to have a visibility level of full visibility, the statistical data provided at 710 is unmasked, for example being provided as a plaintext file. Where the statistical data is determined to have a visibility level of partial or full masking, at least some of the statistical data is provided in a masked format, such as being omitted, scrambled, encrypted, or the like.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is understood that any of aspects 1-12 can be combined with any of aspects 13-16 or 17-20. It is understood that any of aspects 13-16 can be combined with any of aspects 17-20.

Aspect 1. A method of operating a database, comprising:
receiving, at a parser of a database management system (DBMS), a request for a database statistic regarding a database table column from a source, wherein the DBMS is in a trusted execution environment;
determining a visibility level of the database statistic regarding the database table column to the source, based on comparison of the source to permitted viewers of the database statistic; and
providing the requested database statistic to the source, wherein the database statistic provided to the source is based on the visibility level of the database statistic to the source.

Aspect 2. The method according to aspect 1, wherein the database statistic is frequency data for entries of the database table column.

Aspect 3. The method according to aspect 2, wherein the database table column has a security level, and wherein the frequency data provided to the source is further based on the security level.

Aspect 4. The method according to aspect 3, wherein when the source is not a permitted viewer, the frequency data provided to the source based on the security level includes a numeric frequency data having plaintext values and column data having plaintext values when the security level is a low security level.

Aspect 5. The method according to any of aspects 3-4, wherein when the source is not a permitted viewer, the frequency data provided to the source based on the security level includes a numeric frequency data having plaintext values and column data having masked values when the security level is a medium security level.

Aspect 6. The method according to any of aspects 3-5, wherein when the source is not a permitted viewer, the frequency data provided to the source based on the security level includes numeric frequency data having masked values and column data having masked values when the security level is a high security level.

Aspect 7. The method according to aspect 1, wherein the database statistic is histogram data for entries of the database table column.

Aspect 8. The method according to aspect 7, wherein the database table column has a security level, and wherein the characteristics of the histogram data provided to the source are further based on the security level.

Aspect 9. The method according to aspect 8, wherein when the source is not a permitted viewer, the histogram data provided to the source based on the security level includes numeric y-axis data having plaintext values and x-axis value data having plaintext values when the security level is a low security level.

Aspect 10. The method according to any of aspects 8-9, wherein when the source is not a permitted viewer, the histogram data provided to the source based on the security level includes numeric y-axis data having plaintext values and x-axis value data having masked values when the security level is a medium security level.

Aspect 11. The method according to any of aspects 8-10, wherein when the source is not a permitted viewer, the histogram data provided to the source based on the security level includes numeric y-axis data having masked values and x-axis value data having masked values when the security level is a high security level.

Aspect 12. The method according to any of aspects 1-11, further comprising generating, within the DBMS, the database table column the database table column including a column identifier for the database table column, permitted viewers for the database table column, and a security level of the database table column.

Aspect 13. A database management system (DBMS), wherein the DBMS is located within a trusted execution environment, the DBMS comprising:
 a database table column;
 a parser configured to:
  receive a request for a database statistic regarding a database table column from a source; and
  determine a visibility level of the database statistic regarding the database table column to the source, based on comparison of the source to permitted viewers of the database statistic; and
 a runtime environment configured to provide the requested database statistic to the source, wherein the database statistic provided to the source is based on the visibility level of the database statistic to the source.

Aspect 14. The DBMS according to aspect 13, wherein the database table column includes a column identifier for the database table column, permitted viewers for the database table column, and a security level of the database table column and the database statistic provided to the source are further based on the security level.

Aspect 15. The DBMS according to any of aspects 13-14, wherein the database statistic is frequency data for the database table column.

Aspect 16. The DBMS according to any of aspects 13-14, wherein the database statistic is frequency data for the database table column.

Aspect 17. A non-transitory computer-readable medium having computer-executable instructions stored thereon that, upon execution, cause one or more processors to perform operations comprising:
 providing a database management system (DBMS) in a trusted execution environment;
 receiving, at a parser of the DBMS, a request for a database statistic regarding a database table column from a source;
 determining a visibility level of the database statistic regarding the database table column to the source, based on comparison of the source to permitted viewers of the database statistic; and
 providing the requested database statistic to the source, wherein the database statistic provided to the source is based on the visibility level of the database statistic to the source.

Aspect 18. The non-transitory computer-readable medium according to aspect 17, wherein the database table column further includes a security level, and the database statistic provided to the source is further based on the security level.

Aspect 19. The non-transitory computer-readable medium according to any of aspects 17-18, wherein the database statistic is frequency data for the database table column.

Aspect 20. The non-transitory computer-readable medium according to any of aspects 17-18, wherein the database statistic is histogram data for the database table column.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

The invention claimed is:

1. A method of operating a database, comprising:
 receiving, at a parser of a database management system (DBMS), a request for a database statistic regarding a database table column from a source, wherein the DBMS is in a trusted execution environment, and wherein the database statistic comprises histogram data for entries of the database table column;
 determining a visibility level of the database statistic regarding the database table column to the source, based on comparison of the source to permitted viewers of the database statistic; and
 providing the requested database statistic to the source, wherein the database statistic provided to the source is based on the visibility level of the database statistic to the source, wherein when the source is not a permitted viewer and a security level of the database table column is a medium security level, providing the requested database statistic comprises:
  providing plaintext numeric y-axis data;
  masking x-axis value data; and
  providing the masked x-axis value data.

2. The method of claim 1, wherein the database statistic comprises frequency data for entries of the database table column.

3. The method of claim 2, wherein the database table column has a security level, and wherein the frequency data provided to the source is further based on the security level.

4. The method of claim 3, wherein when the source is not a permitted viewer, the frequency data provided to the source based on the security level includes a numeric frequency data having plaintext values and column data having plaintext values when the security level is a low security level.

5. The method of claim 3, wherein when the source is not a permitted viewer, the frequency data provided to the source based on the security level includes a numeric frequency data having plaintext values and column data having masked values when the security level is a medium security level.

6. The method of claim 3, wherein when the source is not a permitted viewer, the frequency data provided to the source based on the security level includes numeric frequency data having masked values and column data having masked values when the security level is a high security level.

7. The method of claim 1, wherein when the source is not a permitted viewer, the histogram data provided to the source based on the security level includes numeric y-axis data having plaintext values and x-axis value data having plaintext values when the security level is a low security level.

8. The method of claim 1, wherein when the source is not a permitted viewer, the histogram data provided to the source based on the security level includes numeric y-axis data having masked values and x-axis value data having masked values when the security level is a high security level.

9. The method of claim 1, further comprising generating, within the DBMS, the database table column the database table column including a column identifier for the database table column, permitted viewers for the database table column, and a security level of the database table column.

10. A database management system (DBMS), wherein the DBMS is located within a trusted execution environment, the DBMS comprising:
    a database table column;
    a parser configured to:
        receive a request for a database statistic regarding a database table column from a source, wherein the database statistic comprises histogram data for entries of the database table column; and
        determine a visibility level of the database statistic regarding the database table column to the source, based on comparison of the source to permitted viewers of the database statistic; and
    a runtime environment configured to provide the requested database statistic to the source, wherein the database statistic provided to the source is based on the visibility level of the database statistic to the source, wherein when the source is not a permitted viewer and a security level of the database table column is a medium security level, providing the requested database statistic comprises:
        providing plaintext numeric y-axis data;
        masking x-axis value data; and
        providing the masked x-axis value data.

11. The DBMS of claim 10, wherein the database table column includes a column identifier for the database table column and permitted viewers for the database table column.

12. The DBMS of claim 10, wherein the database statistic comprises frequency data for the database table column.

13. A non-transitory computer-readable medium having computer-executable instructions stored thereon that, upon execution, cause one or more processors to perform operations comprising:
    providing a database management system (DBMS) in a trusted execution environment;
    receiving, at a parser of the DBMS, a request for a database statistic regarding a database table column from a source, wherein the database statistic comprises histogram data for entries of the database table column;
    determining a visibility level of the database statistic regarding the database table column to the source, based on comparison of the source to permitted viewers of the database statistic; and
    providing the requested database statistic to the source, wherein the database statistic provided to the source is based on the visibility level of the database statistic to the source, wherein when the source is not a permitted viewer and a security level of the database table column is a medium security level, providing the requested database statistic comprises:
        providing plaintext numeric y-axis data;
        masking x-axis value data; and
        providing the masked x-axis value data.

14. The non-transitory computer-readable medium of claim 13, wherein the database statistic comprises frequency data for the database table column.

\* \* \* \* \*